(12) United States Patent
Sugitani et al.

(10) Patent No.: US 11,752,556 B2
(45) Date of Patent: *Sep. 12, 2023

(54) LAMINATION SHAPING COPPER POWDER AND LAMINATED AND SHAPED PRODUCT

(71) Applicants: FUKUDA METAL FOIL & POWDER CO., LTD., Kyoto (JP); TECHNOLOGY RESEARCH ASSOCIATION FOR FUTURE ADDITIVE MANUFACTURING, Tokyo (JP)

(72) Inventors: Yuji Sugitani, Kyoto (JP); Yoshito Nishizawa, Shiga (JP); Takeshi Maruyama, Shiga (JP); Hiroaki Okubo, Shiga (JP)

(73) Assignees: FUKUDA METAL FOIL & POWDER CO., LTD., Kyoto (JP); TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 16/631,832

(22) PCT Filed: Jul. 18, 2017

(86) PCT No.: PCT/JP2017/026000
§ 371 (c)(1),
(2) Date: Jan. 16, 2020

(87) PCT Pub. No.: WO2019/016874
PCT Pub. Date: Jan. 24, 2019

(65) Prior Publication Data
US 2020/0147682 A1      May 14, 2020

(51) Int. Cl.
*B22F 1/00* (2022.01)
*B22F 10/28* (2021.01)
(Continued)

(52) U.S. Cl.
CPC ............... *B22F 10/28* (2021.01); *B22F 1/00* (2013.01); *B33Y 70/00* (2014.12);
(Continued)

(58) Field of Classification Search
CPC ..................................................... B33Y 80/00
See application file for complete search history.

(56) References Cited

U.S. PATENT DOCUMENTS

2016/0332227 A1* 11/2016 Tsubota ................... B22F 3/24

FOREIGN PATENT DOCUMENTS

| CN | 101180146 A | 5/2008 |
|---|---|---|
| CN | 101760664 A | 6/2010 |

(Continued)

OTHER PUBLICATIONS

Walker et al. ("Selective Laser Sintering of Copper-tin Powders", Journal of Materials Research, 2014, vol. 29, Nr: 17, pp. 1997-2005). (Year: 2014).*

(Continued)

*Primary Examiner* — Robert S Jones, Jr.
*Assistant Examiner* — Jiangtian Xu
(74) *Attorney, Agent, or Firm* — Ladas & Parry LLP

(57) ABSTRACT

This invention provides a copper powder to which tin (Sn) is added such that a high-density laminated and shaped product can be obtained by a laminating and shaping method using a fiber laser as a heat source by appropriately reducing the electrical conductivity of copper, so a laminated and shaped product having a high density and a high electrical conductivity can be obtained. That is, this invention provides a copper powder for lamination shaping in which a tin (Continued)

element is added to pure copper. Desirably, the copper powder contains 0.5 wt % or more of the tin element. More desirably, the copper powder contains 5.0 wt % or more of the tin element. When the product has an electrical conductivity sufficient as a copper product, the copper powder desirably contains 6.0 wt % or less of the tin element. Furthermore, no element other than the tin element is desirably added to the copper powder.

15 Claims, 14 Drawing Sheets

(51) Int. Cl.
  B33Y 70/00 (2020.01)
  B33Y 80/00 (2015.01)
(52) U.S. Cl.
  CPC ....... *B22F 2301/10* (2013.01); *B22F 2999/00* (2013.01); *B33Y 80/00* (2014.12)

(56) References Cited

FOREIGN PATENT DOCUMENTS

| | | | |
|---|---|---|---|
| CN | 102974819 A | | 3/2013 |
| CN | 104486910 A | * | 4/2015 |
| CN | 104486910 A | | 4/2015 |
| JP | 2000-336403 A | | 12/2000 |
| JP | 2004034054 A | | 2/2004 |
| JP | 2015-218368 A | | 12/2015 |
| JP | 2016-53198 A | | 4/2016 |
| JP | 2016-89191 A | | 5/2016 |
| JP | 2016-211062 A | | 12/2016 |
| JP | 2017-20101 A | | 1/2017 |
| WO | 2017/110445 A1 | | 6/2017 |

OTHER PUBLICATIONS

IUPAC relative density (Year: 2014).*
Oxford relative density (Year: 2020).*
Mills (Year: 1993).*
Long et al. (CN104486910A) and Walker ("Selective Laser Sintering of Copper-tin Powders", Journal of Materials Research, 2014, vol. 29, Nr: 17, pp. 1997-2005). (Year: 2005).*
Office Action with an English translation dated Jul. 6, 2021 for Chinese Patent Application No. 2017890932233.9.
Espacenet English abstract of CN 102974819 A.
Espacenet Engiish abstract of CN 131180146 A.
Espacenet Engiish abstract of CN 101760664 A.
Espacenet English abstract of JP 2004034054 A
"Metal Materials and Heat Treatment Technologies", Zhao Zhangkui et al., pp. 251-252, National Defence Industry Press, Jan. 31, 2012.
Extended European Search Report dated Dec. 8, 2020 for corresponding Application No. EP 17917935.3.
David C. Walker et al: "Selective laser sintering of composite copper-tin powders", Journal of Materials Research, vol. 29, No. 17, Aug. 12, 2014 (Aug. 12, 2014), pp. 1997-2005, XP055754488, US ISSN: 0884-2914, DOI: 10.1557/jmr.2014.194.
Kathuria et al: "Microstructuring by selective laser sintering of metallic powder", Surface and Coatings Technology, Elsevier BV, Amsterdam, NL, vol. 116-119, Sep. 1, 1999 (Sep. 1, 1999), pp. 643-647, XP027346045, ISSN: 257-8972 [retrieved on Sep. 1, 1999].
Hu J et al: "Laser sintering of green compacts", Optics and Laser Technology, Elsevier Science Publishers BV., Amsterdam, NL, vol. 29, No. 2, Mar. 1, 1997 (Mar. 1, 1997), pp. 75-78, XP004055161, ISSN: 0030-3992, DOI: 10.1016/S0030-3992(96)00042-4.
Syed-Khaja Aarief et al: "Investigations in selective laser melting as manufacturing technology for the production of high-temperature mechatronic integrated devices". 2016 11th International Microsystems, Packaging, Assembly and Circuits Technology Conference (Impact), IEEE, Oct. 26, 2016 (Oct. 26, 2016), pp. 247-250, XP033032615, DOI: 10.1109/IM PACT. 2016.7799997 [retrieved on Dec. 27, 2016].
Espacenet English abstract of CN 104486910 A.
International Search Report (ISR) with an English translation and Written Opinion (WO) dated Aug. 15, 2017 for Application No. PCT/JP2017/026000.
Espacenet English abstract of JP 2017-20101 A.
Espacenet English abstract of JP 2016-89191 A.
Eespacenet English abstract of JP 2015-218368 A.
Respacenet English abstract of JP 2000-336403 A.
Espacenet English abstract of JP 2016-211062 A.
Eespacenet English abstract of JP 2016-53198 A.
Xiaofeng Wang, et al.: Microstructural Features and Mechanical Properties Induced by the Spray Forming and Cold Rolling of the Cu-13.5 wt pct Sn Alloy: Article in Journal of Materials Science and Technology: vol. 24: No. 5: Sep. 2008.

* cited by examiner

LAMINATION SHAPING COPPER POWDER AND LAMINATED AND SHAPED PRODUCT

RELATED APPLICATION

This application is an application under 35 U.S.C. 371 of International Application No. PCT/JP2017/026000 filed on Jul. 18, 2017, the entire contents of which are incorporated herein by reference.

TECHNICAL FIELD

The present invention relates to a copper powder for lamination shaping and a laminated and shaped product.

BACKGROUND ART

Laser-beam lamination shaping uses a fiber laser as a heat source, and forms an arbitrary shape by melting and solidifying a powder bed on which a metal powder is spread. There are examples in which high-density manufacture products can be obtained by using an iron alloy (to be referred to as an Fe alloy) and a nickel alloy (to be referred to as a Ni alloy). However, pure copper is an element having a high electrical conductivity and a high thermal conductivity, and is expected to form an electrically conductive product and a thermally conductive part having complicated shapes by using laser-beam lamination shaping. However, pure copper has not been put into practical use because it is impossible to form a laminated and shaped product having a high density of 98.5% or more at which a coolant such as a gas or water does not leak.

In the above technical field, patent literature 1 discloses, as a copper alloy powder for forming a laminated and shaped product having a relative density of 96% or more, a copper alloy powder containing a total of 1.00 mass % or less of at least one of Cr (chromium) and Si (silicon), and copper as the balance. Cited literature 2 discloses a copper alloy powder containing Cu (copper) as a main metal element, and Zn (zinc), Mn (manganese), Al (aluminum), and Fe (iron) as additive elements, as an example of a copper alloy powder for forming a laminated and shaped product.

CITATION LIST

Patent Literature

Patent literature 1: Japanese Patent Laid-Open No. 2016-211062
Patent literature 2: Japanese Patent Laid-Open No. 2016-053198

SUMMARY OF THE INVENTION

Technical Problem

The abovementioned patent literatures, however, do not mention that the electrical conductivity of copper exerts influence on the density of a laminated and shaped product, which affects the mechanical strength of a laminated and shaped product containing copper as a main component.

The present inventors have found that a high electrical conductivity of pure copper makes it impossible to obtain a high-density laminated and shaped product by lamination shaping using a fiber laser as a heat source. This is so because thermal energy required to melt a pure copper powder cannot be obtained because a laser beam is reflected during laser irradiation.

The present invention provides a technique of solving the above-described problem.

Solution to Problem

One example aspect of the present invention provides a copper powder in which a tin element is added to pure copper.

Another example aspect of the present invention provides a product containing copper as a main component, which is laminated and shaped by a laminating and shaping apparatus using the copper powder for lamination shaping described above.

Advantageous Effects of Invention

According to the present invention, in order to obtain a high-density laminated and shaped product by a lamination shaping method using a fiber laser as a heat source by appropriately decreasing the electrical conductivity of copper, a lamination shaping copper powder to which tin (Sn) is added is provided, and a laminated and shaped product having a high density and a high electrical conductivity can be obtained.

DESCRIPTION OF EXAMPLE EMBODIMENTS

Figure 1:
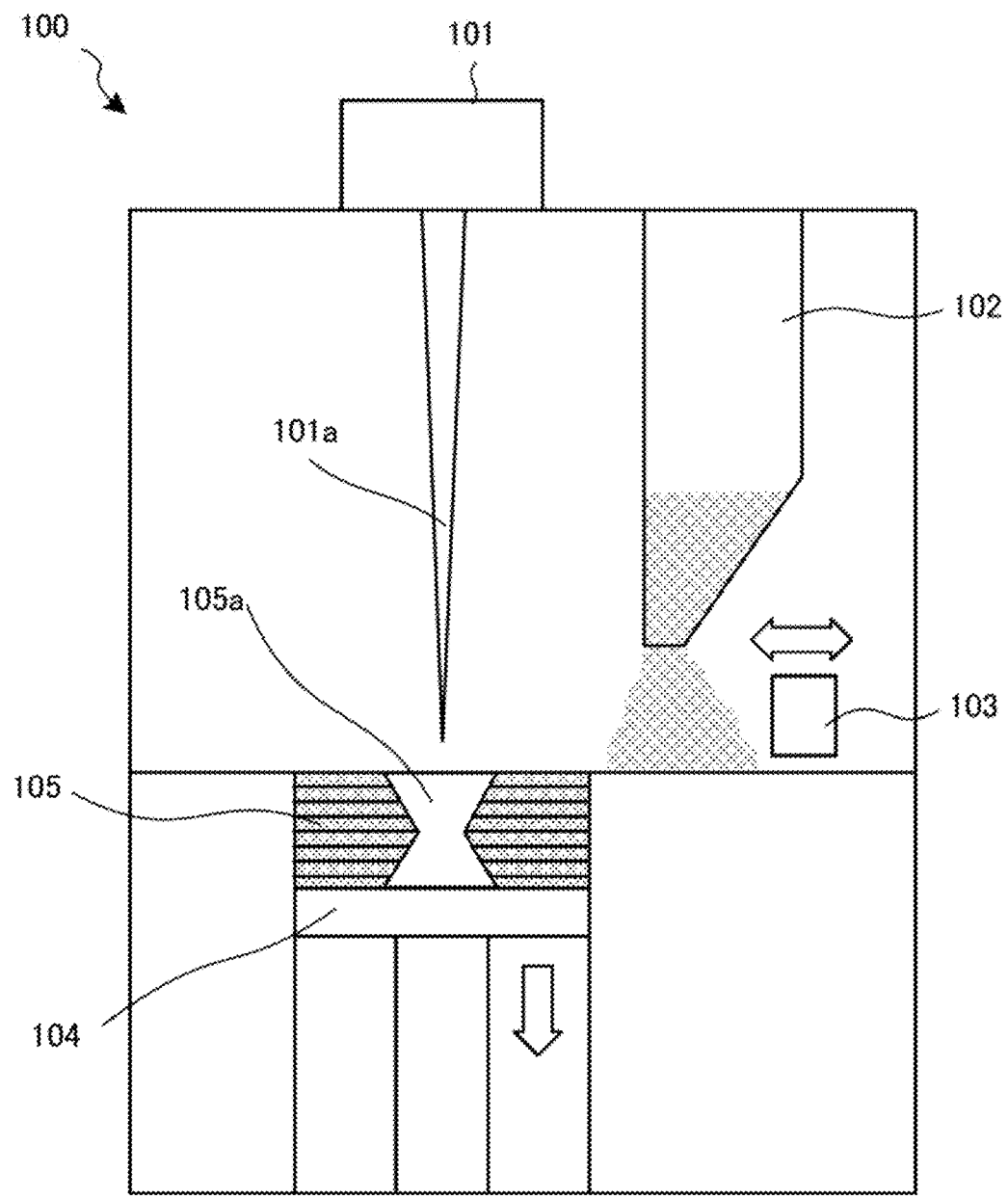
FIG. 1 is a view showing a configuration example of a laminating and shaping apparatus of an example embodiment according to the present invention.
Figure 2A:
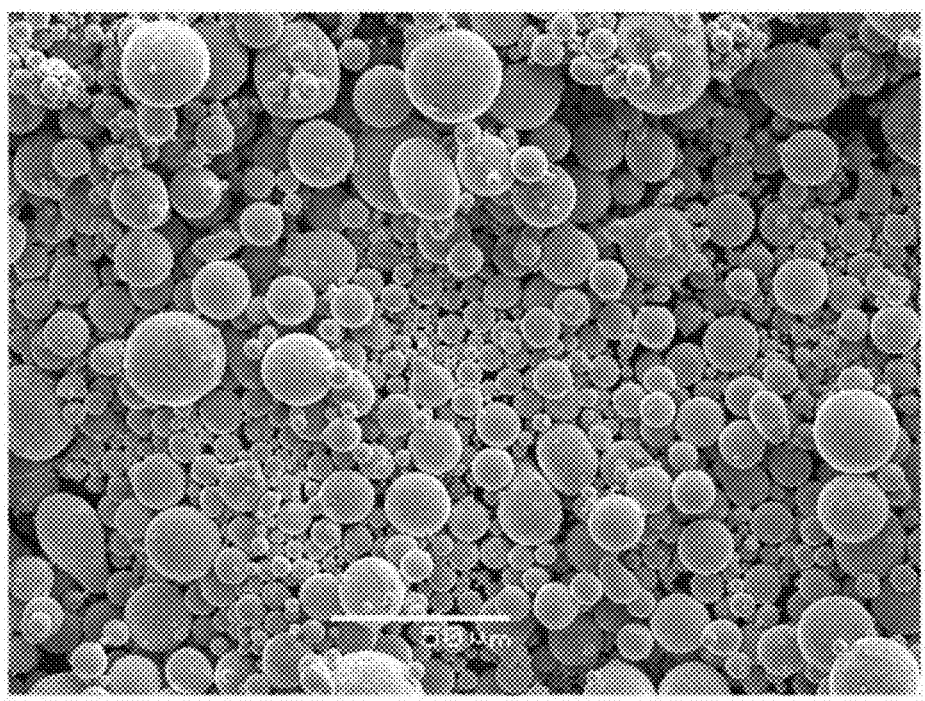
FIG. 2A is a view showing a scanning electron microscope (SEM) image of a copper powder according to Example 1 of the present invention.
Figure 2B:
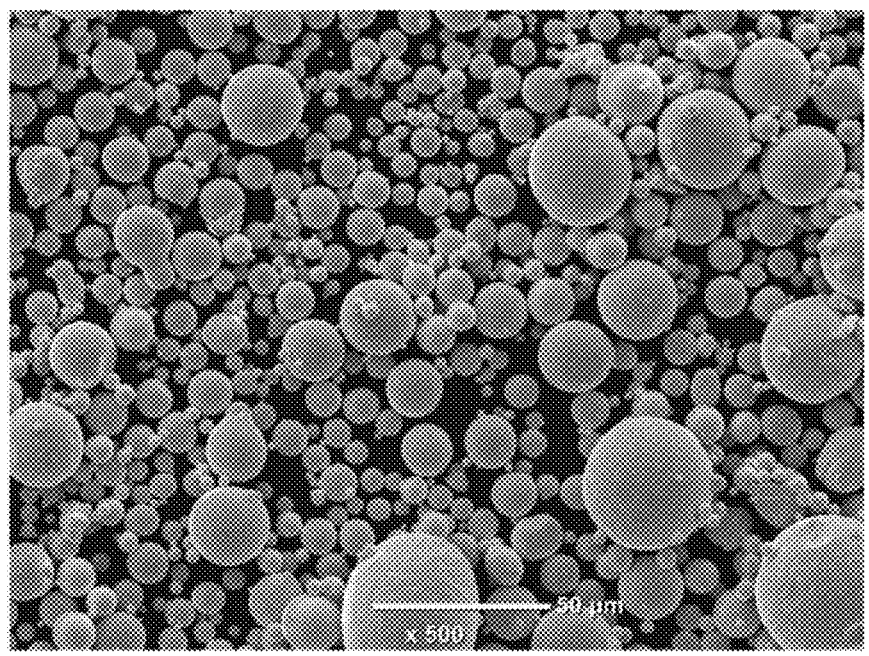
FIG. 2B is a view showing an SEM image of a copper powder according to Example 2 of the present invention.
Figure 2C:
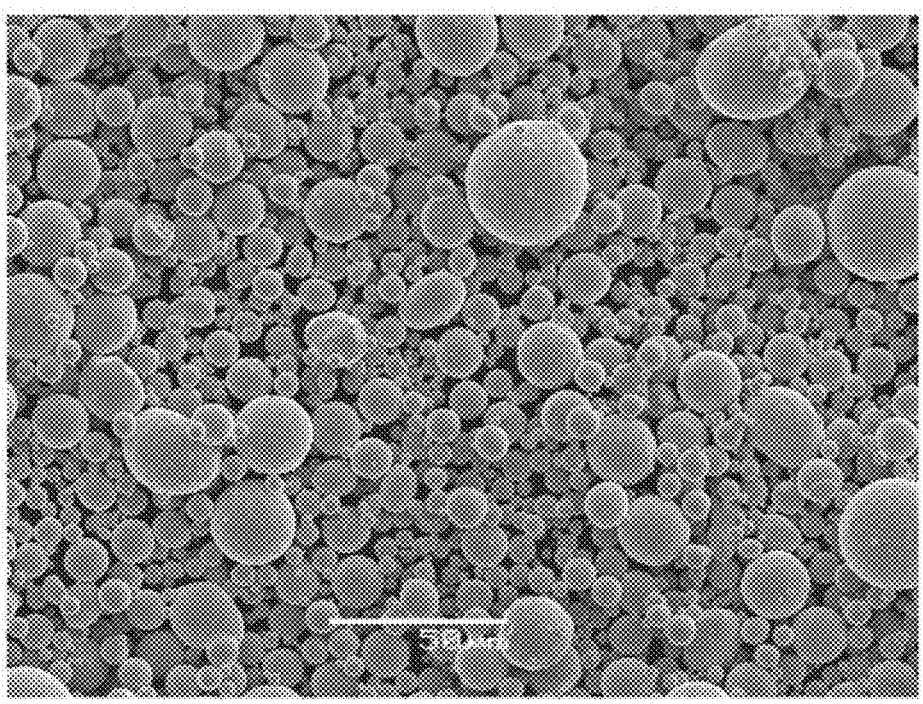
FIG. 2C is a view showing an SEM image of a copper powder according to Example 3 of the present invention.
Figure 2D:
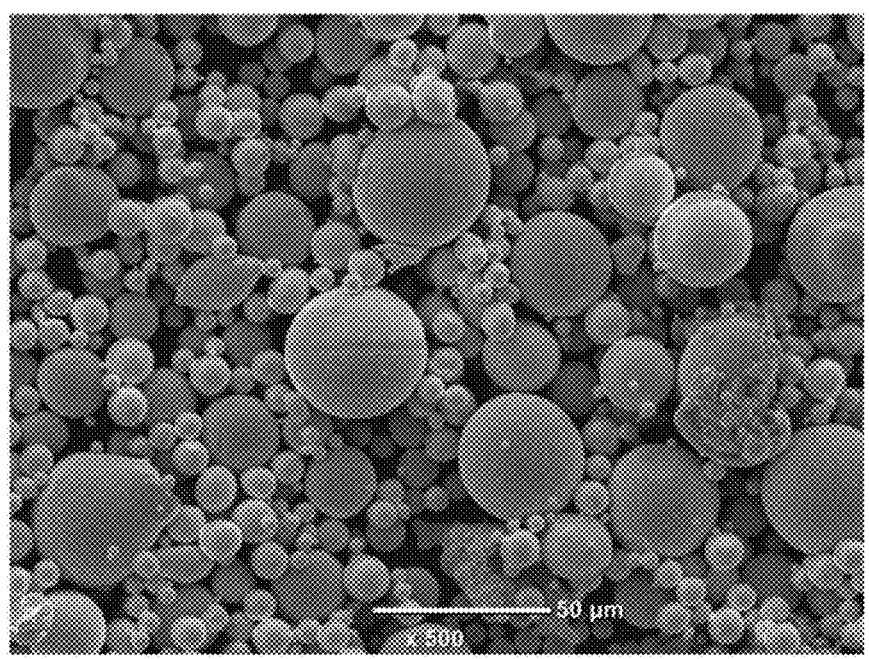
FIG. 2D is a view showing an SEM image of a copper powder according to Example 4 of the present invention.
Figure 2E:
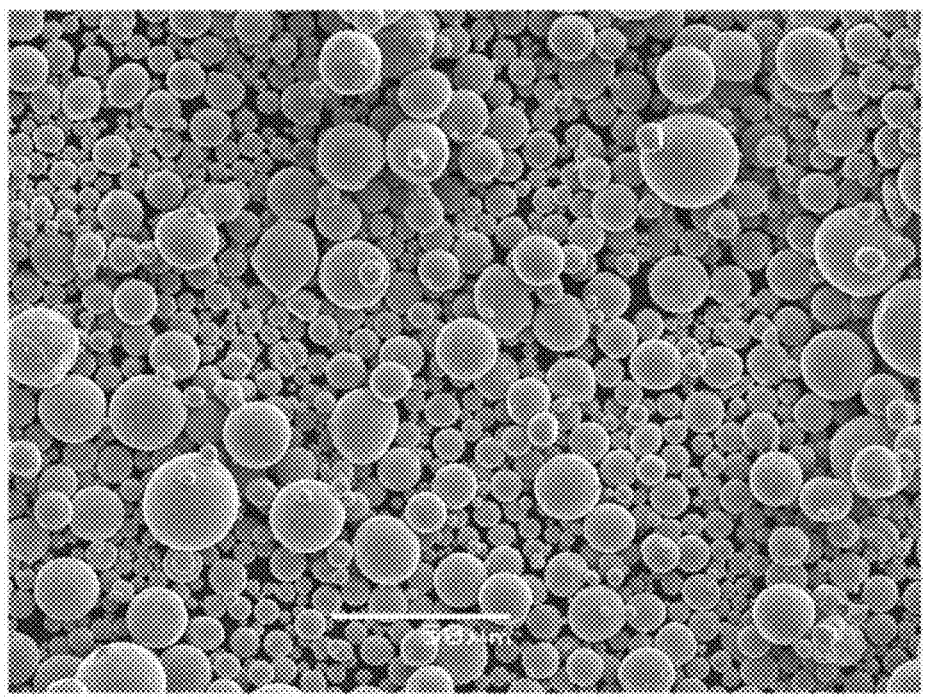
FIG. 2E is a view showing an SEM image of a copper powder according to Example 5 of the present invention.

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

<<Applications of Laminated and Shaped Product Obtained by Lamination shaping Using Copper Powder of this Example Embodiment>>

A copper powder used in this example embodiment is used as a material of lamination shaping. When a laminated and shaped product using the copper powder can be formed, fine shaping can be performed in the fields of an electric circuit connector, a heat sink, a heat exchanger, and the like.

In these applications, a laminated and shaped product using the copper powder desirably has a sufficient density (a density measured by the method of Archimedes is 98.5% or more). Also, when using the electrical conductivity or thermal conductivity of copper, a laminated and shaped product desirably has an electrical conductivity (20% IACS or more) sufficient as a copper product. If the aforementioned measurement density is less than 98.5%, a problem such as a water leak arises. In addition, when using a laminated and shaped product as, e.g., a spring material for a terminal, a conductivity of 20% IACS or more is necessary. Note that a laminated and shaped product using the copper powder is not limited to the above examples, and can also be used as another circuit component or an electromagnetic wave shield component.

<<Copper Powder for Lamination Shaping of this Example Embodiment>>

When using a pure copper powder, a laser beam is reflected due to a high electrical conductivity during laser irradiation, so thermal energy required to melt the pure copper powder cannot be obtained. This makes it impossible to obtain a high-density laminated and shaped product by a lamination shaping method using a fiber laser as a heat source.

Accordingly, this example embodiment provides a copper powder that can be laminated and shaped, and that gives a laminated and shaped product formed by using the copper powder the sufficient density described above and the above-described electrical conductivity sufficient as a copper product. That is, the electrical conductivity can be adjusted by blending a tin (Sn) element in copper. Then, the copper is adjusted to have a particle shape and particle size suitable for a lamination shaping method, and can be provided as a copper alloy powder for lamination shaping.

(Conditions of Copper Powder for Lamination Shaping)

The following conditions are necessary for a copper powder that can be laminated and shaped.

(1) The 50% particle size of copper powder particles is 3 to 200 μm when measured by a laser diffraction method. If the 50% particle size of the copper powder particles is smaller than 3 μm, the particles have no flowability, so no powder bed can be formed in a laminating and shaping apparatus using an SLM method. On the other hand, if the 50% particle size of the copper powder particles is larger than 200 the surface of a powder bed is roughened in a laminating and shaping apparatus using an EBM method, so no powder bed appropriate for shaping can be formed.

(2) The apparent density (AD) of the copper powder is 3.0 g/cm³ or more. If the AD of the copper powder is less than 3.0, the powder packing ratio of a powder bed decreases in a laminating and shaping apparatus, so no appropriate powder bed can be formed.

(3) The flow rate (FR) of the copper powder is 60 sec/50 g or less. If the FR of the copper powder is 60 sec/50 g or more, no powder can be supplied from a supply hopper in a laminating and shaping apparatus, so no appropriate powder bed can be formed.

(Method of Manufacturing Copper Powder for Lamination Shaping)

The copper powder of this example embodiment can be manufactured by, e.g., "a rotating disk method", "a gas atomizing method", "a water atomizing method", "a plasma atomizing method", or "a plasma rotating electrode method". In this example embodiment, "the gas atomizing method" was used among these methods. In this gas atomization, a gas such as helium, argon, or nitrogen was used, and a copper powder was manufactured by controlling powdering by adjusting the pressure and flow rate of the gas. However, a similar copper powder can also be manufactured by using another manufacturing method. The manufactured copper powder was classified by a predetermined classification size.

(Measurement of Characteristics of Copper Powder for Lamination Shaping)

The following characteristics of the manufactured copper powder were measured.

(1) The content of a tin element of the copper powder obtained by adding the tin element to copper was measured by IPC (Inductively Coupled Plasma) atomic emission spectroscopy.

(2) The apparent density (g/cm³) of the copper powder to which a tin element was added was measured in accordance with JIS Z 2504.

(3) The flow rate (sec/50 g) of the copper powder to which a tin element was added was measured in accordance with JIS Z 2502.

(4) The 50% particle size (μm) was measured by a laser diffraction method.

(5) An image of the manufactured copper powder was captured by using an SEM (Scanning Electron Microscope).

(Evaluation of Measurement Results)

The copper powder to which a tin element was added according to this example embodiment satisfied all of (1) the 50% particle size of the copper powder particles, (2) the apparent density of the copper powder, and (3) the flow rate of the copper powder, as the abovementioned conditions in which the lamination shaping by a laminating and shaping apparatus is possible.

<<Manufacture of Laminated and Shaped Product of This Example Embodiment>>

FIG. 1 is a view showing a schematic configuration example of a laminating and shaping apparatus 100 of this example embodiment. The laminating and shaping apparatus 100 includes an emission mechanism 101 for an electron beam or fiber laser 101a, a hopper 102 as a powder tank, a squeezing blade 103 for forming a powder bed by spreading a powder by a predetermined thickness, and a table 104 that repetitively moves down by a predetermined thickness in order to perform lamination. The squeezing blade 103 and the table 104 cooperate with each other to generate a powder laminated portion 105 having a uniform predetermined thickness. Each layer is irradiated with the fiber laser 101a based on slice data obtained from 3D-CAD data, thereby melting a metal powder (in this example embodiment, a copper powder) and manufacturing a laminated and shaped product 105a.

Note that an energy density E (J/mm$^3$) used was adjusted by E=P/(v×s×t) where t: the thickness of the powder bed, P: the output of the laser, v: the operation speed of the laser, and s: the laser scanning pitch.

(Conditions of Laminated and Shaped Product)

The following conditions are necessary for a useful laminated and shaped product of this example embodiment. Of the following conditions, condition (1) is a condition essential to obtain the strength of the laminated and shaped product. On the other hand, condition (2) is a condition that is not essential when the laminated and shaped product is not required to have the electrical conductivity and thermal conductivity of copper, and is a condition when using the electrical conductivity and thermal conductivity of copper.

(1) A laminated and shaped product using a copper powder has a sufficient density. For example, the measurement density obtained by the method of Archimedes is 98.5% or more.

(2) A laminated and shaped product using a copper powder has an electrical conductivity sufficient as a copper product. For example, the electrical conductivity is 20% IACS or more.

(Measurement of Characteristics of Laminated and Shaped Product)

The following characteristics were measured for a laminated and shaped product manufactured by using the copper powder of this example embodiment.

(1) The electrical conductivity (% IACS) of the laminated and shaped product was measured by using an eddy current type conductivity meter.

(2) The density (%) of the laminated and shaped product was measured based on the ratio of the void area divided by the area of the cross-sectional SEM image.

(3) An image of the surface of the manufactured laminated and shaped product was captured by using an SEM (Scanning Electron Microscope).

(Evaluation of Measurement Results)

As the laminated and shaped product manufactured by a laminating and shaping apparatus by using the copper powder to which a tin element was added according to this example embodiment, a laminated and shaped product satisfying abovementioned condition (1) the density is 98.5% or more was manufactured. In addition, a laminated and shaped product satisfying (2) the electrical conductivity is 20% IACS or more was manufactured.

(Composition of Preferable Copper Powder for Lamination Shaping)

This example embodiment provides, by adding a tin element to pure copper, a copper powder that satisfies the aforementioned conditions of the copper powder for lamination shaping, and allows a laminated and shaped product manufactured by lamination shaping by a laminating and shaping apparatus to have the abovementioned sufficient density and an electrical conductivity sufficient as a copper product.

The copper powder of this example embodiment is desirably a copper powder formed by adding 0.5 wt % or more of a tin element to pure copper, and more desirably a copper powder formed by adding 5.0 wt % or more of a tin element to pure copper.

Also, when using the electrical conduction and thermal conduction of copper, the copper powder of this example embodiment is desirably a copper powder formed by adding 6.0 wt % or less of a tin element to pure copper.

In addition, the copper powder of this example embodiment is desirably a copper powder to which elements other than a tin element are not added.

<<Effects of This Example Embodiment>>

According to this example embodiment, it was possible to provide a copper powder to which a tin element was added, and obtain a high-density laminated and shaped product. Furthermore, it was possible to obtain a laminated and shaped product having a high electrical conductivity.

That is, the 50% particle size of the particles of the copper powder is 3 to 200 μm when measured by a laser diffraction method. Therefore, the surface of a powder bed is not roughened, and a sufficient flowability facilitates squeezing. Also, since the apparent density of the copper powder is 3.0 or more, the powder packing ratio of a powder bed is sufficient, so an appropriate powder bed can be formed. In addition, the flow rate of the copper powder is 60 sec/50 g or less. This makes it possible to smoothly supply the powder from the supply hopper, and form an appropriate powder bed.

Also, a high-density laminated and shaped product was obtained because the thermal energy necessary for lamination shaping was decreased by decreasing the electrical conductivity by the addition of a tin element. That is, it was possible to manufacture a laminated and shaped product by using a copper powder by which the density of a manufactured product, which was laminated and shaped under the condition set by the energy density that can be calculated from the laser power, the scan speed, the scan pitch, and the lamination thickness of a powder bed, was 98.5% or more when measured based on the ratio of the void area divided by the area of the cross-sectional SEM image. Furthermore, a laminated and shaped product was manufactured by using a copper powder having an electrical conductivity satisfying 20% IACS or more. Note that the thermal conductivity corresponds to the electrical conductivity by the Wiedemann-Frantz law, so the same applies to a laminated and shaped product manufactured by using a copper powder satisfying a desired thermal conductivity.

EXAMPLES

Examples 1 to 5 according to this example embodiment and Comparative Example 1 will be explained below.

<<Manufacture of Copper Powders for Lamination Shaping>>

By using gases such as helium, argon, and nitrogen as gas atomization of a gas atomizing method, copper powders to which a tin element was added were generated by controlling powdering by adjusting the pressure and flow rate of each gas.

The copper powders were manufactured by changing the content of the tin element in pure copper after the addition to 9.9 (Example 1), 5.1 (Example 2), 3.0 (Example 3), 1.0 (Example 4), 0.5 (Example 5), and 0.2 (Comparative Example 1).

<<Measurement of Characteristics of Copper Powders for Lamination Shaping>>

Figure 3:
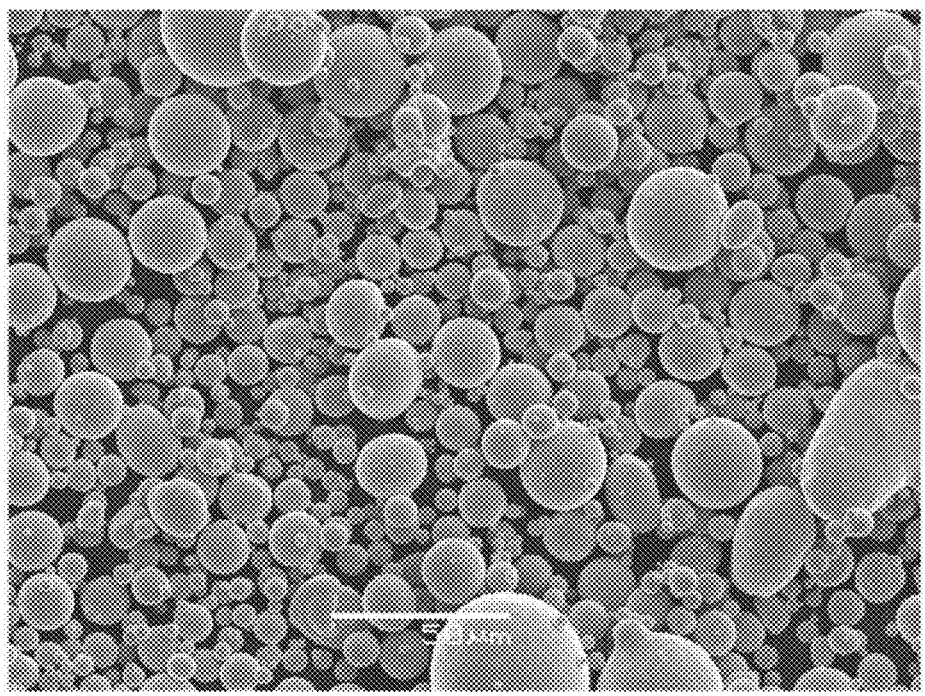
FIG. 3 is a view showing an SEM image of a copper powder according to Comparative Example 1.
Figure 4A:
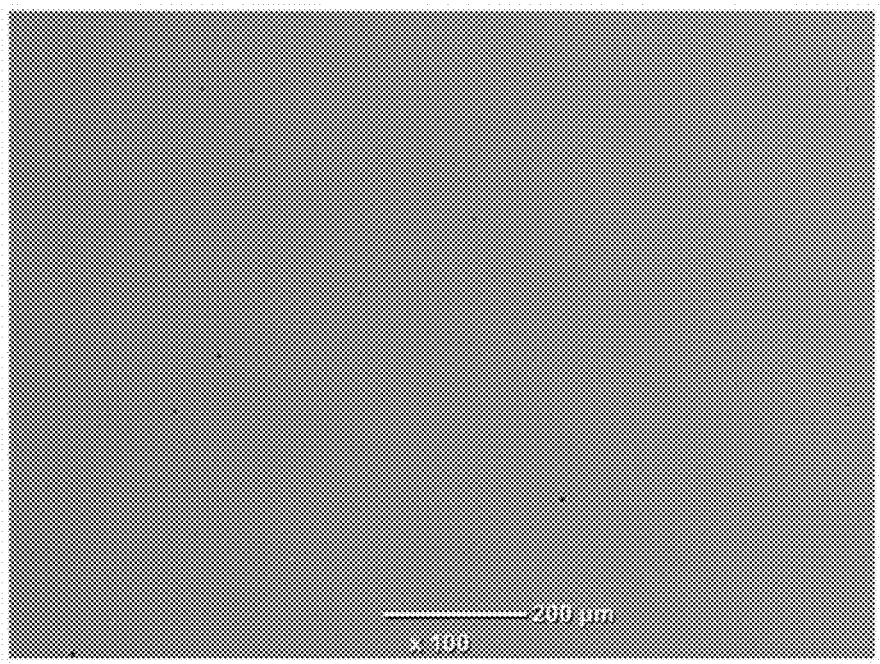
FIG. 4A is a view showing an SEM image of a laminated and shaped product using the copper powder according to Example 1 of the present invention.
Figure 4B:
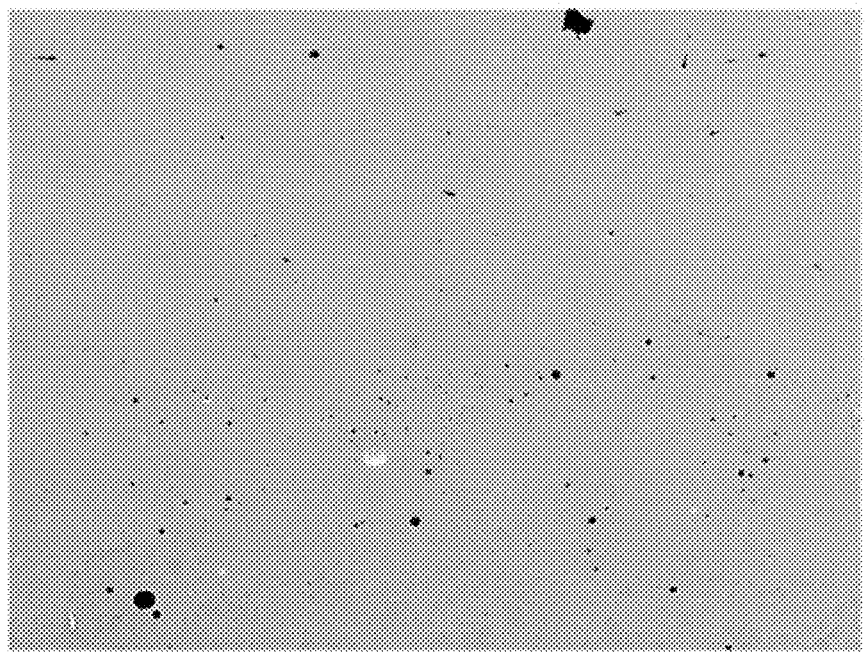
FIG. 4B is a view showing an SEM image of a laminated and shaped product using the copper powder according to Example 2 of the present invention.
Figure 4C:
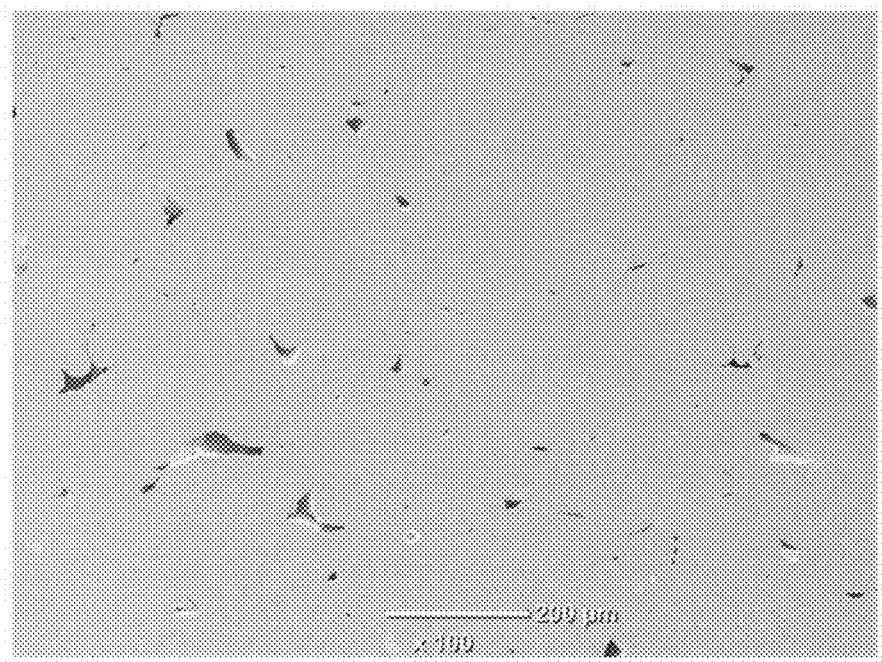
FIG. 4C is a view showing an SEM image of a laminated and shaped product using the copper powder according to Example 3 of the present invention.
Figure 4D:
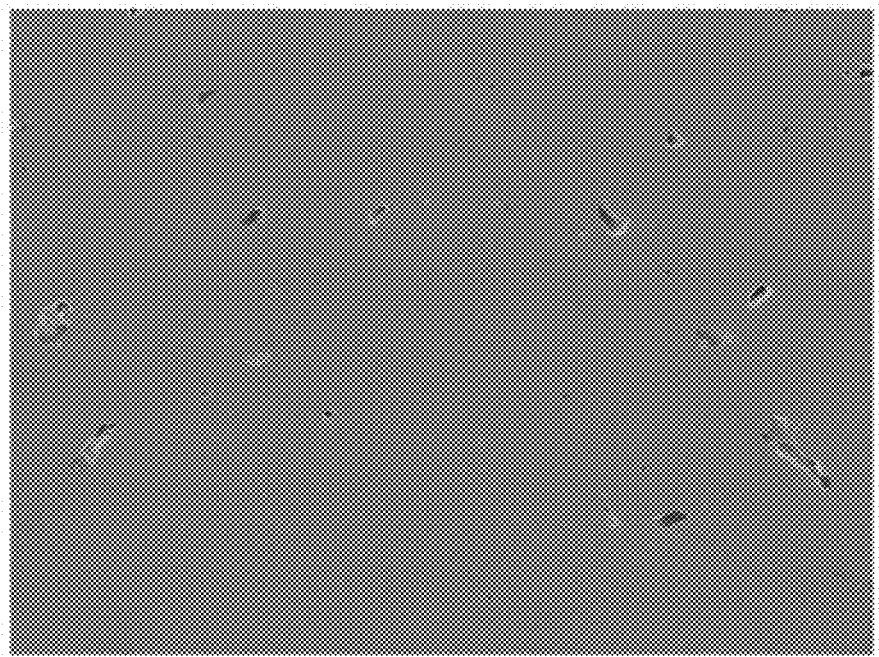
FIG. 4D is a view showing an SEM image of a laminated and shaped product using the copper powder according to Example 4 of the present invention.
Figure 4E:
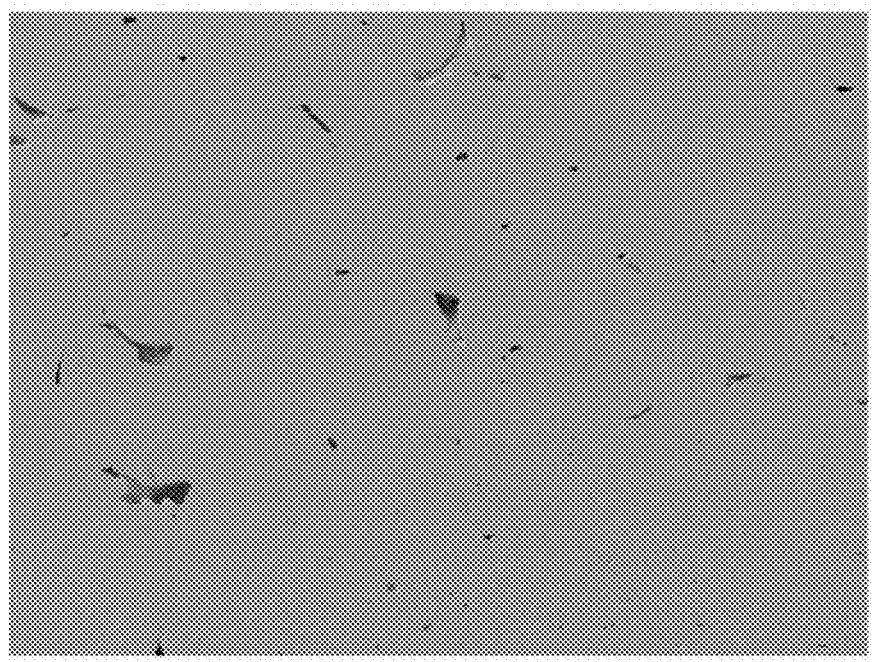
FIG. 4E is a view showing an SEM image of a laminated and shaped product using the copper powder according to Example 5 of the present invention.

Images of the manufactured copper powders were captured by using an SEM (Scanning Electron Microscope) (SEM×500). FIGS. 2A to 2E show the SEM images of the copper powders of Examples 1 to 5. FIG. 3 shows the SEM image of the copper powder of Comparative Example 1.

The content of the tin element in the copper powder to which the tin element was added was measured, by using IPC atomic emission spectroscopy. Also, the apparent density (g/cm³) of the copper powder to which the tin element was added was measured in accordance with JIS Z 2504. In addition, the flow rate (sec/50 g) of the copper powder to which the tin element was added was measured in accordance with JIS Z 2502. Furthermore, the 50% particle size (μm) was measured by a laser diffraction method (MICROTRACK MT3300: manufactured by MicrotackBELL). Table 1 shows the characteristics of the manufactured copper powders of Examples 1 to 5 and Comparative Example 1.

TABLE 1

Characteristics of Manufactured Copper Powders

| | AD (g/cm³) | FR (sec/50 g) | Particle size measured by laser diffraction method 50% D (μm) | Cu wt % | Sn wt % | O wt % |
|---|---|---|---|---|---|---|
| Example 1 | 5.28 | 18.1 | 25.8 | Bal. | 9.9 | 0.03 |
| Example 2 | 5.31 | 13.4 | 29.8 | Bal. | 5.1 | 0.04 |
| Example 3 | 5.27 | 14.7 | 27.4 | Bal. | 3.0 | 0.04 |
| Example 4 | 5.37 | 12.2 | 29.3 | Bal. | 1.0 | 0.04 |
| Example 5 | 5.35 | 13.4 | 28.8 | Bal. | 0.5 | 0.05 |
| Comparative Example 1 | 5.30 | 15.1 | 28.9 | Bal. | 0.2 | 0.05 |

According to Table 1, the copper powders to which the tin element was added according to this example embodiment were powders satisfying all of (1) the 50% particle size of the copper powder particles, (2) the apparent density of the copper powder, and (3) the flow rate of the copper powder, as the aforementioned conditions in which the lamination shaping by the laminating and shaping apparatus is possible.

<<Manufacture of Laminated and Shaped Products>>

Laminated and shaped products were manufactured by a 3D lamination shaping machine (powder sintering lamination shaping/SLM method) by using the copper powders of Examples 1 to 5 and Comparative Example 1.

Laminated and shaped products were manufactured by changing the energy density (J/mm³) by using the copper powders of Examples 1 to 5 and Comparative Example 1. Table 2 shows the energy density (J/mm³).

TABLE 2

Energy Density of Laminated and Shaped Products

| Energy density (J/mm³) | 400.0 | 200.0 | 166.7 | 83.3 |
|---|---|---|---|---|
| Laser output (W) | 800 | 600 | 500 | 500 |
| Laser scanning speed (mm/sec) | 800 | 400 | 400 | 800 |
| Laser scanning pitch (mm) | 0.050 | 0.150 | 0.150 | 0.150 |
| Thickness of powder bed (mm) | 0.050 | 0.050 | 0.050 | 0.050 |

As the characteristic measuring laminated and shaped product samples, parallepiped laminated and shaped products each having 10 mm (width)×7 mm (depth)×5 mm (height) were manufactured.

Figure 5:
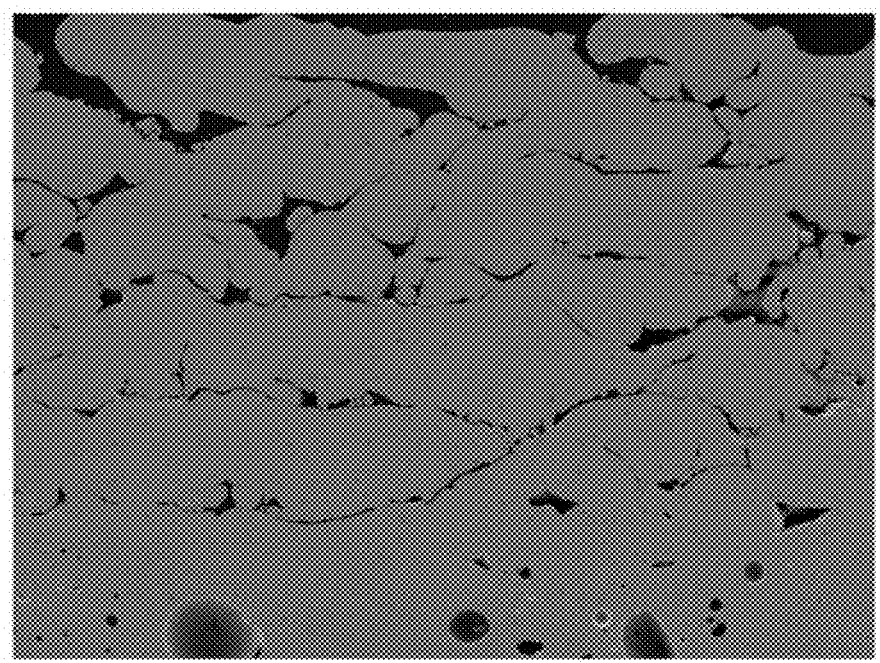
FIG. 5 is a view showing an SEM image of a laminated and shaped product using the copper powder according to Comparative Example 1.

Images of the surfaces of the manufactured laminated and shaped products were captured by using an SEM (Scanning Electron Microscope) (SEM×100). FIGS. 4A to 4E show the SEM images of the laminated and shaped products of Examples 1 to 5. FIG. 5 shows the SEM image of the laminated and shaped product of Comparative Example 1. Note that Examples 1 to 3 and Comparative Example 1 are SEM images of laminated and shaped products obtained by performing lamination shaping at 200 J/mm³, and Example 4 (FIG. 4D) and Example 5 (FIG. 4E) are SEM images of laminated and shaped products obtained by performing lamination shaping at 400 J/mm³ by which the density of the laminated and shaped product was equal to or higher than the target (98.5%).

Also, the electrical conductivity (% IACS) of the laminated and shaped product was measured by using an eddy current type conductivity meter (a high-performance eddy current type conductivity meter Sigma Checker: manufactured by NIHON MATECH). In addition, the density (%) of the laminated and shaped product was measured based on the value of the void area divided by the area of the cross-sectional SEM image. Table 3 shows the characteristics of the manufactured laminated and shaped products of Examples 1 to 5 and Comparative Example 1. The laminated and shaped product having a density of 98.5% or more was used to measure the electrical conductivity (% IACS) of the laminated and shaped product.

TABLE 3

Characteristics of Laminated and Shaped Products Using Copper Powders

| | Amount of Sn wt % | Laminated and shaped product density (%) | | | | Electrical conductivity (% IACS) | | |
|---|---|---|---|---|---|---|---|---|
| | | 400.0 J/mm³ | 200.0 J/mm³ | 166.7 J/mm³ | 83.3 J/mm³ | Bulk | 200.0 J/mm³ shaped product | 400.0 J/mm³ shaped product |
| Example 1 | 9.9 | — | 99.4 | 99.3 | 99.8 | 13.3 | 13.3 | — |
| Example 2 | 5.1 | — | 99.5 | 99.6 | 94.6 | 22.5 | 22.4 | — |
| Example 3 | 3.0 | — | 98.5 | 97.9 | 94.2 | 30.9 | 23.4 | — |
| Example 4 | 1.0 | 98.8 | 92.4 | 94.0 | 87.3 | 53.9 | — | 37.1 |
| Example 5 | 0.5 | 98.7 | 94.5 | 90.0 | 85.3 | 72.0 | — | 45.3 |
| Comparative Example 1 | 0.2 | 90.2 | 90.7 | 88.5 | 87.5 | 87.6 | 29.2 | — |

| | Amount of Sn wt % | Laminated and shaped product density (%) | | | |
|---|---|---|---|---|---|
| | | 400.0 J/mm³ | 200.0 J/mm³ | 166.7 J/mm³ | 83.3 J/mm³ |
| Example 1 | 9.9 | — | . | . | . |
| Example 2 | 5.1 | — | . | . | X |
| Example 3 | 3.0 | — | ○ | X | X |

. 99.0-100.0%

TABLE 3-continued

Characteristics of Laminated and Shaped Products Using Copper Powders

| | | | | | | | |
|---|---|---|---|---|---|---|---|
| Example 4 | 1.0 | ○ | X | X | X | ○ | 98.5-98.9% |
| Example 5 | 0.5 | ○ | X | X | X | X | 98.4% or less |
| Comparative Example 1 | 0.2 | X | X | X | X | — | Shaping was impossible |

Figure 6:
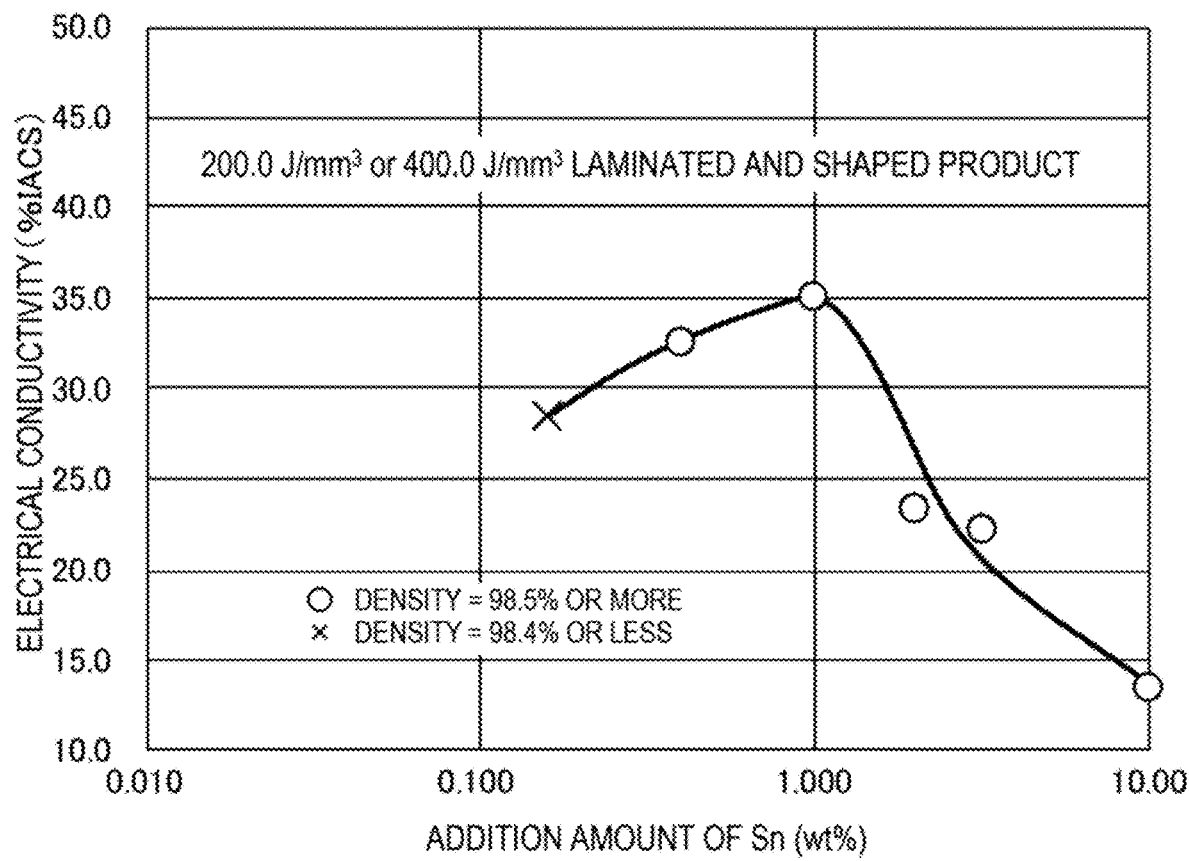
FIG. 6 is a graph showing the electrical conductivity of each of the laminated and shaped products using the copper powders of Examples 1 to 5 according to the present invention and Comparative Example 1.

FIG. 6 is a graph showing the electrical conductivities of the laminated and shaped products using the copper powders of Examples 1 to 5 according to the present invention and Comparative Example 1. Note that as to Examples 1 to 5, the measurement results of the laminated and shaped products having a density of 98.5% or more are shown.

As shown in Table 3 and FIGS. 4A to 4E and 6, laminated and shaped products satisfying (1) the density is 98.5% or more as the abovementioned condition were manufactured, as the laminated and shaped products manufactured by a laminating and shaping apparatus by using the copper powders to which a tin element was added according to this example embodiment. Furthermore, laminated and shaped products satisfying (2) the electrical conductivity is 20% IACS or more were manufactured.

That is, a laminated and shaped product having a density of 98.5% or more cannot be manufactured at any energy density of 400.0 J/mm² or less if the content of a tin element is 0.2 wt % or less. However, a laminated and shaped product can be manufactured by adjusting the energy density when the content of a tin element is 0.5 wt % or more. In addition, a laminated and shaped product having a density of 99.0% or more cannot be manufactured at any energy density of 400.0 J/mm² or less if the content of a tin element is less than 5.0 wt %. However, a laminated and shaped product can be manufactured by adjusting the energy density when the content of a tin element is 5.0 wt % or more.

Also, a laminated and shaped product having an electrical conductivity of 20.0% IACS or more cannot be manufactured if the content of a tin element exceeds 6.0 wt %. However, a laminated and shaped product can be manufactured by adjusting the energy density when the content of a tin element is 6.0 wt % or less.

The invention claimed is:

1. A copper powder for lamination shaping, the copper powder comprising particles, each of the particles including a tin element and pure copper, wherein an amount of the tin element in the copper powder is equal to or more than 0.5 wt %, and equal to or less than 6.0 wt %, wherein a flow rate of particles in the copper powder is in the range of 12.2-18.1 s/50 g when measured by a measurement method of JIS Z 2502.2.

2. The copper powder according to claim 1, wherein a median particle size (D50) of particles in the copper powder is 3 to 200 μm when measured by a laser diffraction method.

3. The copper powder according to claim 1, wherein an apparent density of particles in the copper powder is equal to or more than 3.0 g/cm³ when measured by a laser measurement method of JIS Z 2504.

4. The copper powder according to claim 1, wherein the copper powder is made by adding the tin element to the pure copper using a gas atomizing method.

5. A product containing copper as a main component, which is laminated and shaped by a laminating and shaping apparatus using the copper powder for lamination shaping according to claim 1.

6. The product according to claim 5, wherein a density of the product is equal to or more than 98.5%.

7. The product according to claim 6, wherein the density is equal to or more than 99.0%.

8. The product according to claim 5, wherein an electrical conductivity of the product is equal to or more than 20.0% IACS.

9. The product according to claim 8, wherein a thermal conductivity of the product corresponds to the electrical conductivity of equal to or more than 20.0% IACS.

10. The product according to claim 6, wherein an electrical conductivity of the product is equal to or more than 20.0% IACS.

11. The product according to claim 7 wherein an electrical conductivity of the product is equal to or more than 20.0% IACS.

12. A product containing copper as a main component, which is laminated and shaped by a laminating and shaping apparatus using the copper powder for lamination shaping according to claim 1.

13. The product according to claim 12, wherein a density of the product is equal to or more than 98.5%.

14. The product according to claim 13 wherein an electrical conductivity of the product is equal to or more than 20.0% IACS.

15. A method of manufacturing the copper powder usable for lamination shaping according to claim 1, comprising:
producing the copper powder using a tin element and pure copper by a gas atomizing method, so that an amount of the tin element in the copper powder is equal to or more than 0.5 wt %, and equal to or less than 6.0 wt %; and
classifying the produced copper powder by a predetermined classification size.

* * * * *